(12) United States Patent
Keil

(10) Patent No.: US 7,654,384 B1
(45) Date of Patent: Feb. 2, 2010

(54) ADJUSTABLE CONVEYOR FOR VARIED SIZE AND SHAPE CONTAINERS

(75) Inventor: Hubert H. Keil, Boonton, NJ (US)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 51 days.

(21) Appl. No.: 12/072,654

(22) Filed: Feb. 27, 2008

(51) Int. Cl.
*B65G 33/06* (2006.01)
(52) U.S. Cl. ..................................................... 198/625
(58) Field of Classification Search ................. 198/625, 198/626.3
See application file for complete search history.

(56) References Cited

U.S. PATENT DOCUMENTS

| | | | | |
|---|---|---|---|---|
| 3,054,496 A | * | 9/1962 | Carter | 198/459.4 |
| 4,947,979 A | * | 8/1990 | Martin et al. | 198/343.1 |
| 5,050,720 A | * | 9/1991 | Crankshaw | 198/467.1 |
| 5,407,057 A | * | 4/1995 | Baranowski | 198/448 |
| 7,331,444 B2 | * | 2/2008 | Barilovits et al. | 198/626.3 |
| 2003/0188956 A1 | * | 10/2003 | Lepage | 198/550.1 |

* cited by examiner

*Primary Examiner*—Mark A Deuble
(74) *Attorney, Agent, or Firm*—Michael R. Philips

(57) ABSTRACT

A conveyor for varied size and shape containers has a pair of feed screws mounted parallel to one another on opposite sides of a line of container travel. A mechanism is provided for moving the screws toward or away from one another in a manner to maintain an equal distance of each screw from the line of container travel. The screws are preferably formed with a helix having straight sidewalls that are at an angle of 90° to 100° to one another. In one embodiment one feed screw has a left hand helix and is rotated in a first direction and the other feed screw has a right hand helix and is rotated in a second direction opposite to the first direction.

13 Claims, 5 Drawing Sheets

ADJUSTABLE CONVEYOR FOR VARIED SIZE AND SHAPE CONTAINERS

FIELD OF THE INVENTION

The present invention relates to the field of apparatus for conveying containers in a process such as filling, and more particularly to rotating screw conveyor apparatus.

BACKGROUND OF THE INVENTION

A common type of conveyor for moving containers in a processing environment has a rotating screw on one side of a linear series of containers and a wall or bar guide on the other side of the line of containers. The containers are held in the helical groove of the screw by the guide wall and moved along by the rotation of the screw. The conveyor positions the containers in a process station, for example a filling machine that fills each container with the required material. Accurate and efficient filling is predicated on alignment between the filling station and the series of containers that are conveyed along a central line of travel. When a different size container is to be processed, the spacing between the screw and the guide wall must be adjusted. Since the screw is connected to a driving mechanism for rotation, space adjustment is generally made by changing the position of the guide wall. Moving the guide wall relative to the screw will define a new central line of travel for the containers. The filling machine then must be moved to be in alignment with the new line of travel along which the different size containers are to be conveyed. This step of aligning the filling machine with the line of travel of the containers is time consuming and may result in loss of accuracy of filling. Therefore, a need exists for an apparatus that retains a constant line of container travel regardless of the size of the containers being processed, thus reducing changeover time and increasing filling efficiency and accuracy.

SUMMARY OF THE INVENTION

The present invention provides an adjustable container conveyor having a pair of mirror image feed screws that are positioned parallel to one another. The feed screws are equally spaced on either side of the container line of travel. The feed screws are supported on a mechanism for lateral movement closer together or further apart from the line of travel. When adjustment of the conveyor for container size is needed, the lateral movement mechanism is activated, moving the feed screws either toward each other or away from each other with both feed screws remaining equally spaced from the line of travel. In a further aspect of the invention, the grooves in the feed screws are formed in the shape of a "V" to securely drive containers of varied cross sectional sizes and shapes.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENTS

Figure 1:
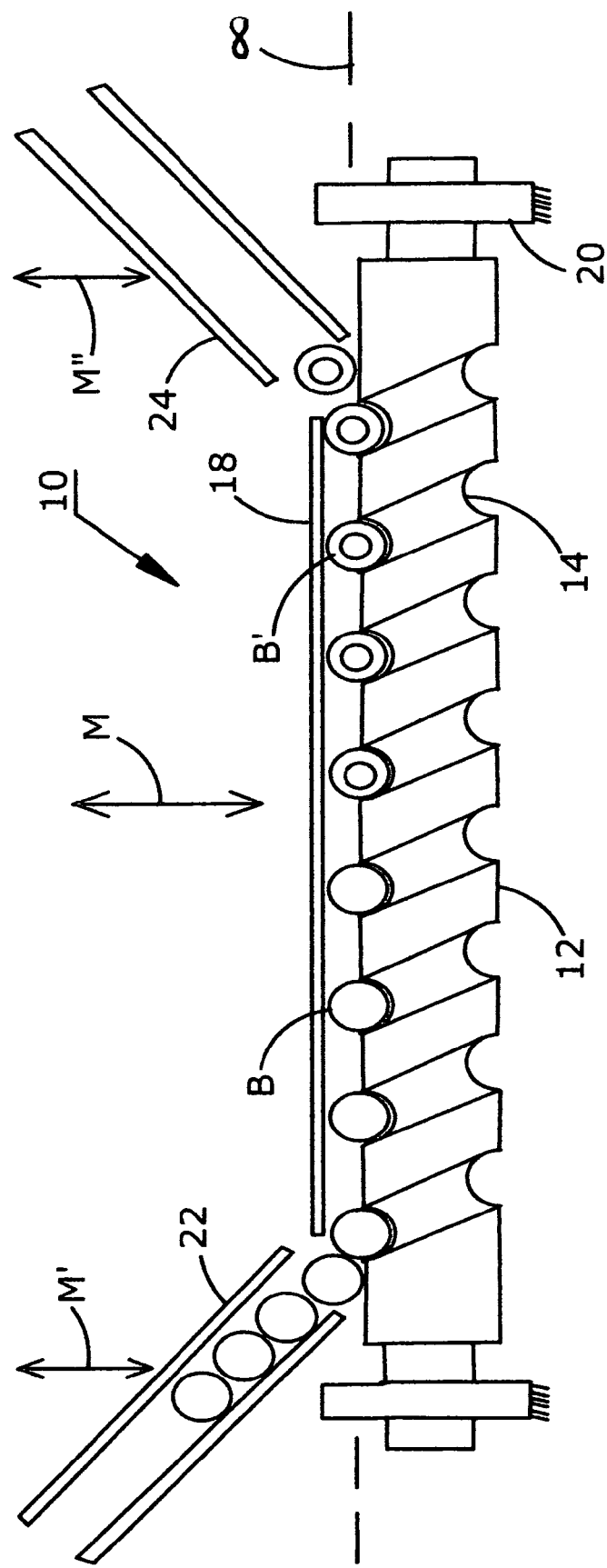
FIG. 1 is a top plan view of a screw conveyor apparatus according to the prior art.

Referring now to FIG. 1, a typical screw conveyor 10 according to the prior art is illustrated in top plan view. Screw 12 is formed by cutting a helix that is similar in cross section to the shape of the container B, e.g. round, with substantially uniform spacing between adjacent coils 14 of the helix to convey containers B in a spaced series. Screw 12 is positioned in parallel to a guide bar or wall 18, with screw 12 mounted in fixed position in bearings 20, and wall 18 adjustable in the direction indicated by arrow M. Empty containers B are moved into engagement between screw 12 and guide wall 18 by an infeed channel 22. Screw 12 is rotated by any available drive device, e.g. a servomotor. Once engaged by screw 12, containers B are moved along a line of travel $\alpha$, representing their common centerline. As containers B are conveyed by screw 12, a filling apparatus (not shown) fills each container B with the contents; filled containers are identified as B'. Upon completion of the filling process, and optionally the application of container closures, filled containers B' are pushed into a discharge channel 24 to be moved to a further process station, e.g. labeling.

When conveyor 10 must be adjusted to handle a different size container B, guide wall 18 is moved in one of the directions indicated by arrow M, depending on whether the new containers are larger or smaller than the prior containers B. If the size of the new containers is significantly different, or the new containers are a different shape, screw 12 must be replaced with another screw of appropriate configuration. Also, infeed channel 22 and discharge channel 24 are adjusted to accommodate the new size or shape containers by moving the respective wall that resides distal from screw 12 as indicated by arrows M' and M". With guide wall 18 and channels 22 and 24 adjusted to accommodate containers of a different size, the original line of travel $\alpha$ is not aligned with the filling station and/or closure applicator. Therefore, further adjustment is needed to position the filling station and/or closure applicator along a new line of travel $\alpha$.

Figure 2:
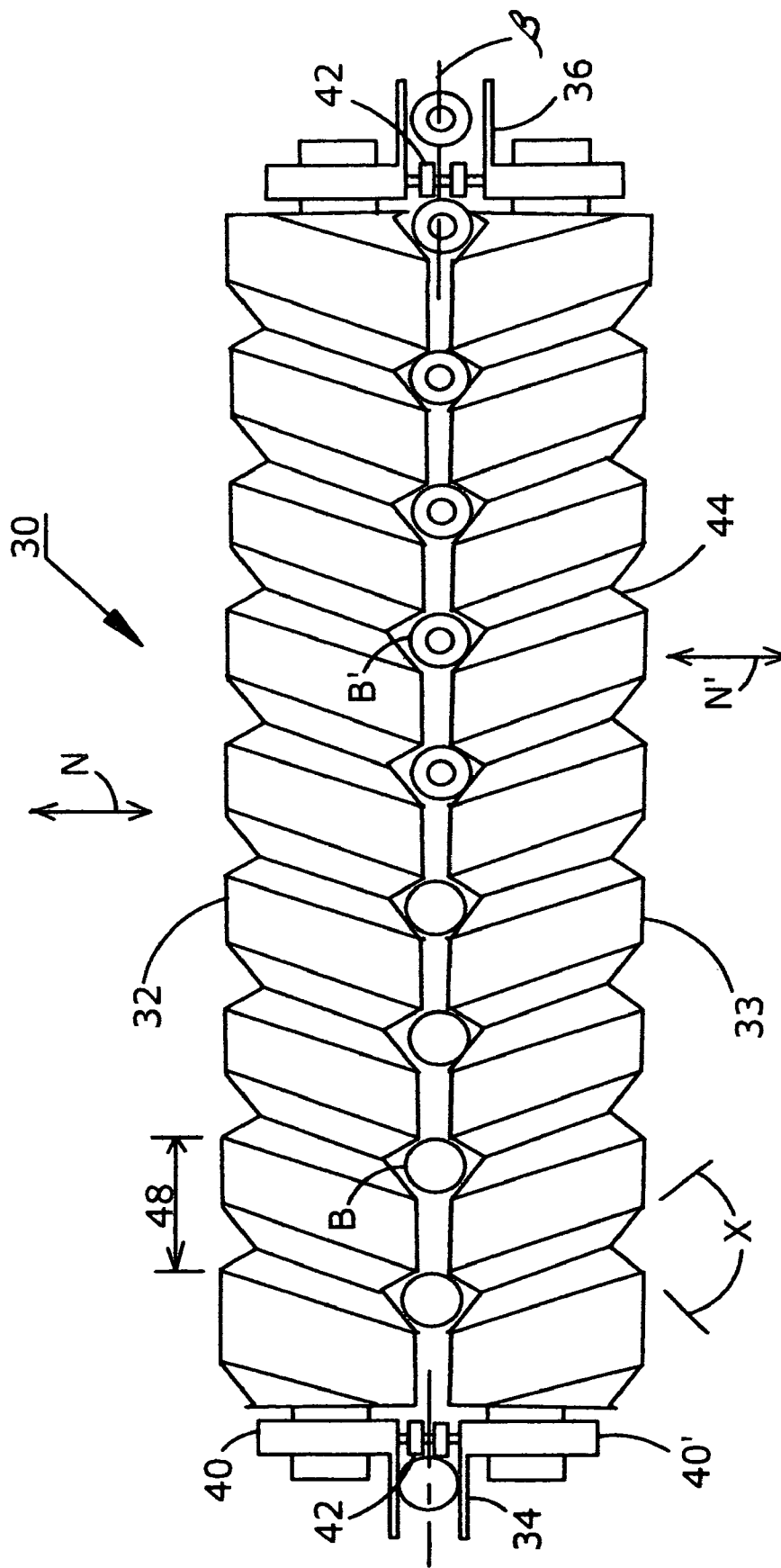
FIG. 2 is a top plan view of a screw conveyor apparatus according to the present invention with a series of round containers being conveyed for processing.

Referring now to FIG. 2, the container conveyor 30 of the present invention is illustrated in top plan view as conveying a series of objects, e.g. containers B, that are round when viewed from above. As will be described in detail below, the present invention conveyor is similarly useful to move containers B of different sizes and shapes. Containers B' are each shown with an internal circle to indicate having been filled with the required contents from a station for filling or other process (not shown). A first conveyor element, e.g. screw 32, and a second conveyor element, e.g. screw 33, are mounted in parallel to one another in moveable bearings 40, 40'. Screw 32 is preferably formed with a left hand helix, and screw 33 is preferably formed with a right hand helix. The helix of screw 32 is synchronized with the helix of screw 33 to cooperatively grasp and convey each container B. As used herein, synchronization of the mirror image screws 32, 33 indicates that a section of the helix of each is directly aligned with a comparable section of the opposed helix. An infeed channel 34 transports a series of containers B along a line of travel β to an entry point of screws 32, 33. The guide walls defining infeed channel 34 and discharge channel 36 are preferably mounted to respective bearings 40 in order that infeed channel 34 and discharge channel 36 become wider and narrower by the same mechanism that is provided to move screws 32, 33 laterally. Discharge channel 36 transports filled containers B' away from screws 32, 33. Clockwise rotation of screw 32 and counterclockwise rotation of screw 33 will move containers B from infeed channel 34 to discharge channel 36 and hold containers B downward against a support platform (not shown) rather than causing containers B to rise and eject. Alternately, feed screws 32, 33 are rotated in the same direction, in which case both screw 32 and 33 are formed with the same direction helix, e.g. right hand helix. Screws 32, 33 are equally spaced from line of travel β along which containers B, B' are moved by rotation of screws 32, 33. Screws 32, 33 are driven by conventional means, e.g. a servomotor with a timing belt connected to each (not shown), and may operate either continuously or intermittently. A dual lead screw 42 is located below moveable bearings 40, 40' to move bearings 40, 40' and screws 32, 33 linearly toward each other or away from each other in the direction indicated by arrows N, N' as will be discussed below.

The invention provides a further enhancement by forming concave helices cut into screws 32, 33 with opposed straight sidewalls to form a "V", the sidewalls meeting to form an angle X. Angle X is at least, and preferably more than, 90° to accommodate a number of sizes and shapes of containers B. According to a preferred embodiment of the invention, angle X is approximately 100°. Forming each helix with straight sidewalls that meet at angle X enables conveyor 30 to convey containers B, B' of different sizes and shapes as will be discussed below. Whereas the preferred embodiment of the invention is illustrated with angle X formed with equal length sidewalls depending from the outer diameter of screws 32, 33, alternate configurations of angle X are also deemed to be within the scope of the invention. Furthermore, it is within the scope of the present invention to form helix grooves 44 in alternate geometric shapes, e.g. semi-circular, according to the shape of the containers to be conveyed. The pitch distance 48 between successive helix grooves 44 is established according to the size of containers B and the requirements of the processing station being employed. In the case of FIG. 2, with containers B, B' being substantially round in shape, the sidewalls of the helices in screws 32, 33 tangentially contact containers B, B'. It is understood that the depth of each helix into respective screws 32, 33 is less than one-half the diameter of a minimum diameter container B in order to assure that screws 32, 33 do not touch one another while maintaining secure contact with containers B, B'. The angular form of the helix accommodates containers B, B' of various diameters ranging up to the pitch distance 48 between successive grooves 44.

Figure 3:
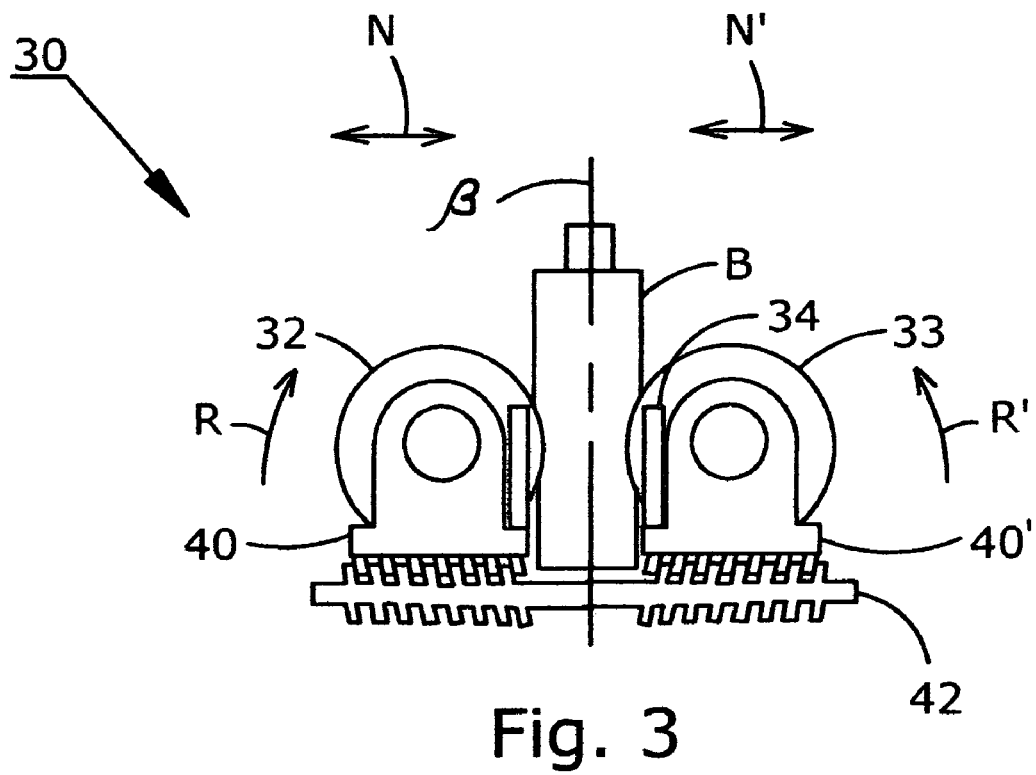
FIG. 3 is an end elevation view of the screw conveyor apparatus of FIG. 2.
Figure 4:
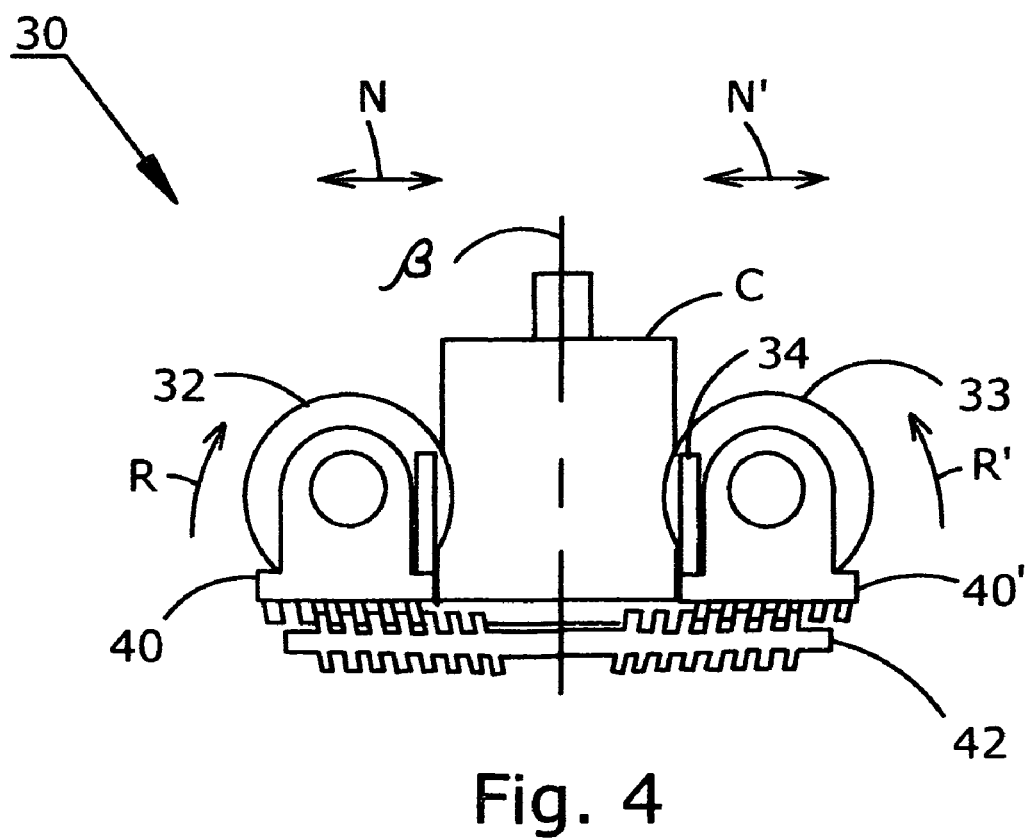
FIG. 4 is an end elevation view of the screw conveyor apparatus of FIG. 2 adjusted to convey larger containers.

Referring now to FIGS. 3 and 4 showing conveyor 30 of FIG. 2 in end elevation views, screw 32 and screw 33 are moved closer to or further from one another in equal increments relative to line of travel β by actuation of dual lead screw 42. As illustrated, screw 32 rotates in the direction indicated by arrow R and screw 33 rotates in the direction indicated by arrow R'. Dual lead screw 42 is formed as a single shaft having a left hand screw thread on one end to engage, e.g. bearing 40 of screw 32 and a right hand screw thread on the other end to engage, e.g. bearing 40' of screw 33. As illustrated in FIG. 2, one dual lead screw 42 engages a first end of each feed screw 32, 33 and a second dual lead screw 42 engages a second end of each feed screw 32, 33. Dual lead screws 42 may be adjusted manually by means of a crank or wrench, or by a servomotor drive (not shown). Causing dual lead screws 42 to rotate in a first direction moves feed screw 32 linearly away from feed screw 33 as indicated by arrow N and simultaneously moves feed screw 33 linearly away from feed screw 32 as indicated by arrow N' to accommodate a container B of larger diameter. Causing dual lead screws 42 to rotate in a second direction moves feed screw 32 linearly toward feed screw 33 as indicated by arrow N and simultaneously moves feed screw 33 linearly toward feed screw 32 as indicated by arrow N' to accommodate a container B of smaller diameter. According to a major objective of the invention disclosed, regardless of the spacing between screw 32 and screw 33, both screws remain equidistant from line of travel β, thus maintaining line of travel β relative to the filling or other process station used. In FIG. 4, the container is elliptical in shape and designated C as described in reference to FIG. 5 below.

Figure 5:
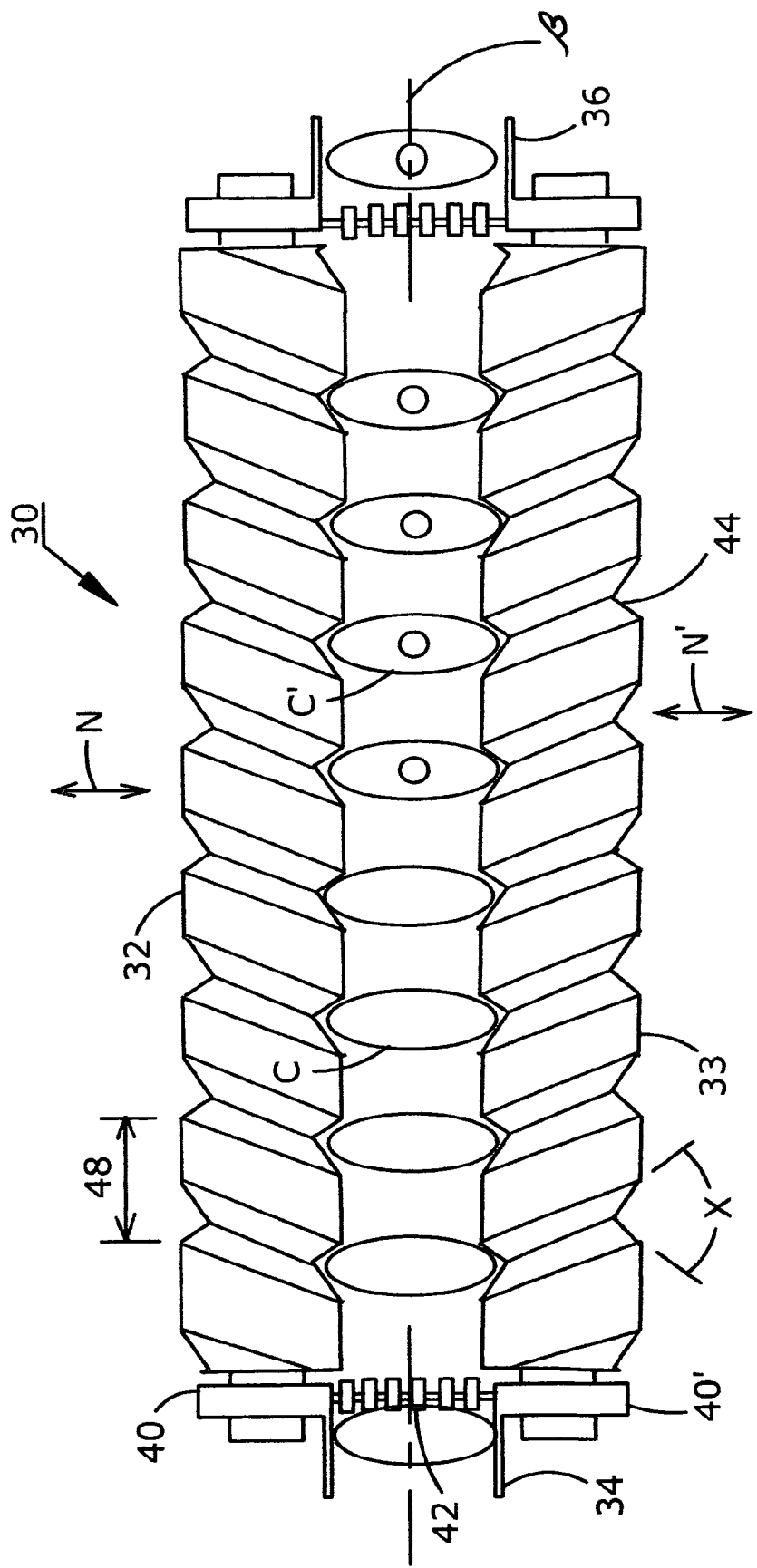
FIG. 5 is a top plan view of the screw conveyor apparatus depicted in FIG. 4 with a series of elliptical containers being conveyed.

Referring now to FIG. 5, screw 32 and screw 33 are illustrated residing relatively separate from one another for moving a series of containers C, C' that are elliptical when viewed from above. Whereas the minor diameter of containers C, C' is similar in size to the diameter of round containers B, B' of FIG. 2, elliptical containers C, C' are able to be conveyed on the same screws 32, 33 as containers B, B'. As indicated above, screws 32, 33 have been moved apart in the directions indicated by arrows N, N' to accommodate the greater major diameter of containers C, C', while maintaining a line of travel β that is aligned with the processing station (not shown).

Figure 6:
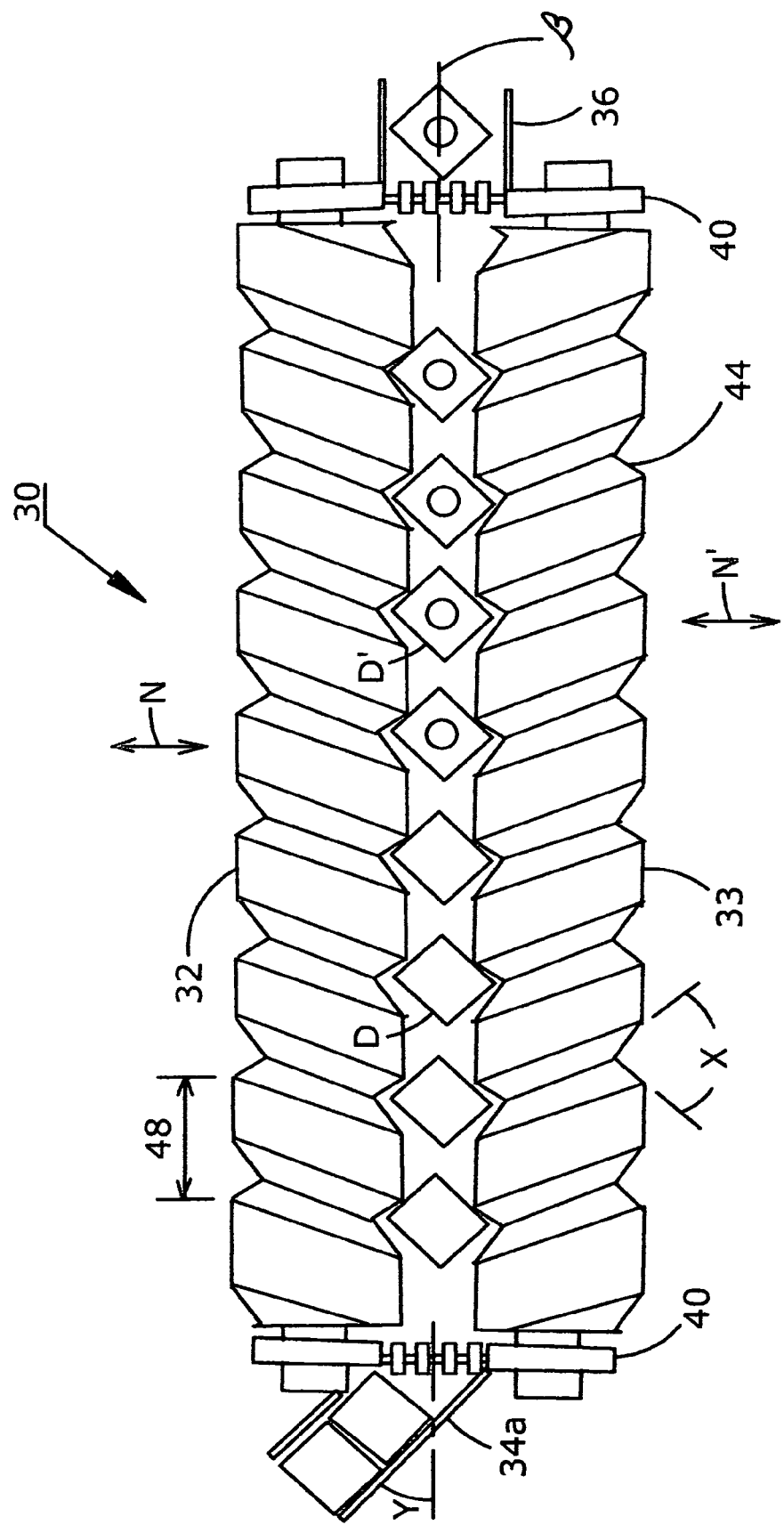
FIG. 6 is a top plan view of the screw conveyor of FIG. 5 adjusted to convey square containers.

Referring now to FIG. 6, screws 32 and 33 of conveyor 30 are illustrated as being positioned to receive and convey a series of containers D, D' that are substantially square when viewed from above. Square containers D, D' are preferably conveyed by screws 32, 33 while oriented with their flat side surfaces at an angle of approximately 45° to line of travel β to engage opposed corners of containers D, D' in the helix grooves 44 of screws 32, 33. For square or rectangular containers such as containers D, D', the infeed channel 34a is oriented at an angle Y of approximately 45° to place the containers with opposed corners aligned with the opposed helices of screws 32, 33. The angle X between straight sidewalls of the screw helix is greater than 90° and up to approximately 100° to securely engage, but not bind corners of, a substantially rectangular or square container D, D'. When conveyor 30 is utilized to hold and convey a container of rectangular (but not square) shape, screw 32 is to be positioned out of synchronization from screw 33 to engage the angular grooves of helices 44 with opposed corners of the rectangle of containers D, D'.

While the description above discloses preferred embodiments of the present invention, it is contemplated that numerous variations and modifications of the invention are possible and are considered to be within the scope of the claims that follow.

What is claimed is:

1. An adjustable conveyor for moving varied size and shape containers in spaced apart relation, the conveyor comprising:
   a. a first feed screw mounted for rotation in a first direction;
   b. a second feed screw mounted for rotation in a second direction opposite to the first direction;
   c. whereas the first feed screw and the second feed screw are parallel to and equidistant from a line of travel for containers being conveyed thereby; and
   d. means for moving the first feed screw and the second feed screw simultaneously in opposite linear directions substantially perpendicular to the line of travel.

2. The conveyor described in claim 1, wherein the first feed screw is formed with a left hand helix and the second feed screw is formed with a right hand helix.

3. The conveyor described in claim 1, further comprising an infeed channel having guide walls each mounted cooperatively with the first feed screw and the second feed screw for being moved in opposite linear directions substantially perpendicular to the line of travel.

4. The conveyor described in claim 1, further comprising a discharge channel having guide walls each mounted cooperatively with the first feed screw and the second feed screw for being moved in opposite linear directions substantially perpendicular to the line of travel.

5. The conveyor described in claim 1, wherein the first feed screw and the second feed screw are each formed with a concave helix having substantially linear sidewalls.

6. The conveyor described in claim 5, wherein the sidewalls are oriented at an angle of at least approximately 90° to one another.

7. The conveyor described in claim 6, wherein the angle between the sidewalls is approximately 100°.

8. The conveyor described in claim 1, wherein the first feed screw and the second feed screw are rotated in opposite rotational directions to press containers conveyed thereby against a supporting surface.

9. The conveyor described in claim 1, wherein the means for moving the first feed screw and the second feed screw simultaneously linearly along a direction substantially perpendicular to the line of container travel comprises a dual lead screw, a first portion of which being engaged with a bearing supporting the first feed screw and a second portion of which being engaged with a bearing supporting the second feed screw.

10. A conveyor for varied size and shape objects comprising
   a. a first conveyor element mounted for rotation;
   b. a second conveyor element mounted for rotation substantially parallel to the first conveyor element;
   c. the first and the second conveyor elements residing on opposite sides of a line of container travel; and
   d. means for moving the first and the second conveyor elements simultaneously in opposite directions in equal increments along a line substantially perpendicular to the line of conveyor travel;
   e. wherein the first and second conveyor elements comprise concave helices with angular grooves for holding and moving the objects.

11. The conveyor described in claim 10, wherein the concave helices are each formed with substantially linear sidewalls oriented at an angle to one another of at least 90°.

12. The conveyor described in claim 11, wherein the angle between the sidewalls of the helices is approximately 100°.

13. The conveyor described in claim 10, wherein the first and the second conveyor elements maintain containers in substantially spaced relation along the line of travel.

* * * * *